United States Patent
Budd

(10) Patent No.: US 9,563,018 B2
(45) Date of Patent: Feb. 7, 2017

(54) TAPERED PHOTONIC WAVEGUIDE TO OPTICAL FIBER PROXIMITY COUPLER

(71) Applicant: International Business Machines Corporation, Armonk, NY (US)

(72) Inventor: Russell A. Budd, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/510,373

(22) Filed: Oct. 9, 2014

(65) Prior Publication Data

US 2016/0103279 A1 Apr. 14, 2016

(51) Int. Cl.
- G02B 6/30 (2006.01)
- G02B 6/122 (2006.01)
- G02B 6/12 (2006.01)
- G02B 6/13 (2006.01)

(52) U.S. Cl.
CPC ........... G02B 6/305 (2013.01); G02B 6/12004 (2013.01); G02B 6/1228 (2013.01); G02B 6/13 (2013.01)

(58) Field of Classification Search
None
See application file for complete search history.

(56) References Cited

U.S. PATENT DOCUMENTS

| | | | | |
|---|---|---|---|---|
| 5,703,980 | A * | 12/1997 | MacElwee | G02B 6/30 385/30 |
| 6,269,211 | B1 * | 7/2001 | Hatayama | G02B 6/305 385/129 |
| 6,293,688 | B1 | 9/2001 | Deacon | |
| 6,801,692 | B2 | 10/2004 | Nishimura et al. | |
| 6,931,180 | B2 | 8/2005 | Madsen et al. | |
| 7,142,748 | B1 * | 11/2006 | Yang | G02B 6/30 385/14 |
| 7,643,710 | B1 | 1/2010 | Liu | |
| 7,720,340 | B2 | 5/2010 | Lewis et al. | |

(Continued)

FOREIGN PATENT DOCUMENTS

WO 03/062883 A2 7/2003

OTHER PUBLICATIONS

Kim et al., "Widely Tunable Filter Based on Coupling Between a Side-Polished Fiber and a Tapered Planar Waveguide", IEEE Photonics Technology Letters, vol. 17, No. 1, Jan. 2005, pp. 142-144.

Primary Examiner — Mike Stahl
(74) Attorney, Agent, or Firm — L. Jeffrey Kelly

(57) ABSTRACT

A photonic waveguide structure may include a tapered photonic waveguide structure within a photonic substrate, such that the tapered photonic waveguide structure has a tapered region that progressively tapers in width along a longitudinal length of the tapered photonic waveguide structure. The photonic waveguide structure also includes an optical fiber waveguide having a core region and a cladding region, whereby a portion of the core region is partially exposed by removing a portion of the cladding region. An outer surface of the portion of the core region that is partially exposed is substantially coupled to the tapered photonic waveguide structure. An optical signal propagating along the tapered photonic waveguide structure is coupled from the tapered region of the tapered photonic waveguide structure to the core region of the optical fiber waveguide via the core region that is partially exposed.

16 Claims, 11 Drawing Sheets

(56) References Cited

U.S. PATENT DOCUMENTS

| | | | |
|---|---|---|---|
| 8,254,737 B2 | 8/2012 | Choudhury et al. | |
| 2002/0074086 A1* | 6/2002 | Nakamura | C09J 183/04 156/329 |
| 2003/0081902 A1* | 5/2003 | Blauvelt | G02B 6/12002 385/50 |
| 2003/0113054 A1* | 6/2003 | Furuyama | G02B 6/4214 385/14 |
| 2003/0123804 A1* | 7/2003 | Nikonov | G01M 11/37 385/49 |
| 2004/0114869 A1 | 6/2004 | Fike et al. | |
| 2005/0018970 A1* | 1/2005 | Tseng | G02B 6/30 385/49 |
| 2005/0123244 A1 | 6/2005 | Block et al. | |
| 2010/0111473 A1 | 5/2010 | Pinguet et al. | |
| 2012/0141069 A1 | 6/2012 | Ming-Chang et al. | |
| 2012/0230635 A1* | 9/2012 | Yoshida | G02B 6/125 385/43 |
| 2013/0022316 A1 | 1/2013 | Pelletier et al. | |
| 2013/0170807 A1* | 7/2013 | Hatori | G02B 6/1228 385/129 |
| 2013/0322813 A1* | 12/2013 | Grondin | B82Y 20/00 385/14 |
| 2014/0050442 A1* | 2/2014 | Wurster | G02B 6/30 385/50 |
| 2014/0334781 A1* | 11/2014 | Fiorentino | G02B 6/3855 385/78 |
| 2015/0023631 A1* | 1/2015 | Shastri | B32B 37/16 385/14 |
| 2015/0247974 A1* | 9/2015 | Painchaud | G02B 6/305 385/14 |
| 2016/0077282 A1* | 3/2016 | Lipson | G02B 6/4291 385/30 |

* cited by examiner

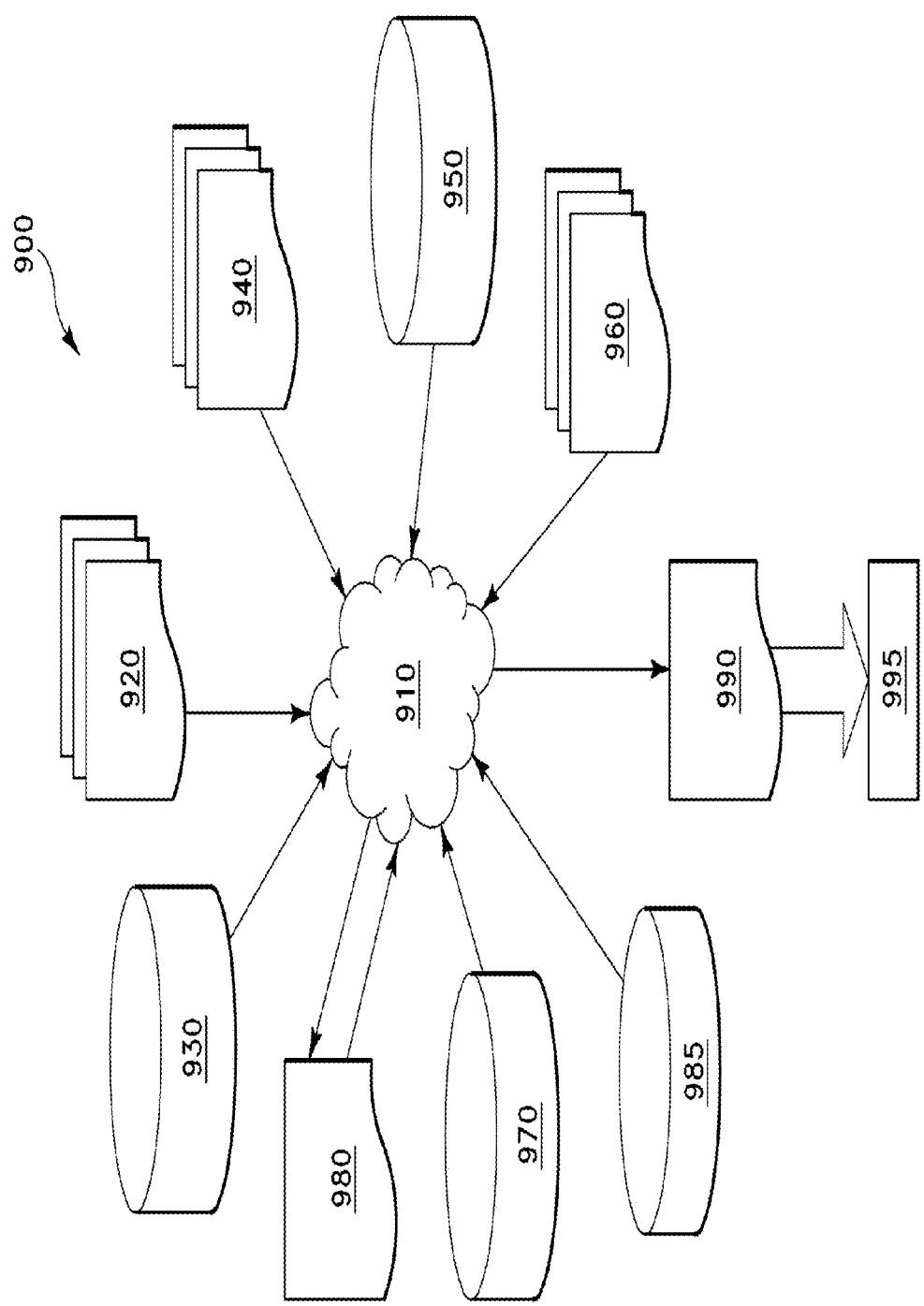

TAPERED PHOTONIC WAVEGUIDE TO OPTICAL FIBER PROXIMITY COUPLER

BACKGROUND

The present invention generally relates to photonic waveguide structures, and more particularly, to photonic waveguide structures coupling to optical fibers.

Single mode silicon photonic optical devices (e.g., single mode lasers), integrated on silicon, may be implemented as an alternative to Vertical Cavity Surface-Emitting Lasers (VCSELs) utilized within multi-mode optical transceivers. These single mode silicon photonic optical devices employ single mode waveguides with dimensions in the order of about, for example, 0.2 microns ($\mu m$)×1.0 microns ($\mu m$).

A 0.2 $\mu m$×1.0 $\mu m$ single mode waveguide may accordingly be utilized to couple optical signals to an optical fiber waveguide for transmission of the optical signals to another device or system. It may, however, be challenging to couple these optical signals from the 0.2 $\mu m$×1 $\mu m$ single mode waveguide to an 8-10 $\mu m$ core size single mode optical fiber while maintaining a high optical coupling efficiency.

SUMMARY

According to at least one embodiment, a photonic waveguide structure may include a tapered photonic waveguide structure within a photonic substrate. The tapered photonic waveguide structure may include a tapered region that progressively tapers in width along a longitudinal length of the tapered photonic waveguide structure, and an optical fiber waveguide having a core region and a cladding region. A portion of the core region is partially exposed by removing a portion of the cladding region, whereby an outer surface of the portion of the core region that is partially exposed is substantially coupled to the tapered photonic waveguide structure. An optical signal propagating along the tapered photonic waveguide structure is coupled from the tapered region of the tapered photonic waveguide structure to the core region of the optical fiber waveguide via the core region that is partially exposed.

According to at least one other embodiment, a photonic waveguide structure may include a first tapered photonic waveguide structure located within a photonic substrate for guiding an optical signal, whereby the first tapered photonic waveguide structure has a tapered region that progressively tapers in width along a longitudinal length of the first tapered photonic waveguide structure. A second tapered photonic waveguide is located within the photonic substrate, whereby the second tapered photonic waveguide is located adjacent one side of the first tapered photonic waveguide structure and is separated from the first tapered photonic waveguide structure by a dielectric material. A third tapered photonic waveguide is located within the photonic substrate, whereby the third tapered photonic waveguide is located adjacent an opposing side to the one side of the first tapered photonic waveguide structure and is separated from the first tapered photonic waveguide structure by the dielectric material. An optical fiber waveguide includes a core region and a cladding region, such that a portion of the core region is partially exposed by removing a portion of the cladding region. An outer surface of the portion of the core region that is partially exposed is substantially coupled to the first tapered photonic waveguide structure, whereby the optical signal propagating along the first tapered photonic waveguide structure is coupled from the tapered region of the first tapered photonic waveguide structure to the core region of the optical fiber waveguide via the core region that is partially exposed. The optical signal propagating along the first tapered photonic waveguide structure undergoes, based on the second and the third tapered photonic waveguide structure, a mode broadening prior to being coupled from the tapered region of the first tapered photonic waveguide structure to the core region of the optical fiber waveguide.

According to at least one other embodiment, a method of forming a photonic waveguide coupling device from a fiber optic ferrule device having a single row of substantially parallel fiber holes for receiving a plurality of optical fibers and a pair of alignment holes is provided. The method may include forming a fiber mounting block by removing a top portion of the fiber optic ferrule device, whereby the removed top portion converts the single row of substantially parallel fiber holes into a single row of substantially parallel channels and converts the pair of alignment holes into a pair of alignment channels. A plurality of optical fibers having end facets are placed in the single row of substantially parallel channels, such that the end facets are substantially flush with end portions of the single row of substantially parallel channels. The plurality of optical fibers are polished for exposing the core regions of the plurality of optical fibers and generating a downward sloping angle along the length of the core regions towards the end facets. The exposed core regions of the plurality of optical fibers that include the downward sloping angle along the length of the core regions towards the end facets provide optical coupling with a plurality of tapered photonic waveguide structures in an integrated circuit.

BRIEF DESCRIPTION OF THE SEVERAL VIEWS OF THE DRAWINGS

FIG. 7 is a flow diagram of a design process used in semiconductor design, manufacture, and/or test.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The following described and illustrated exemplary embodiments are directed to, among other things, a photonic waveguide structure that includes one or more tapered photonic waveguide structures within an integrated circuit that are either directly or proximity coupled to the core of one or more optical fiber waveguides.

Figure 1A:
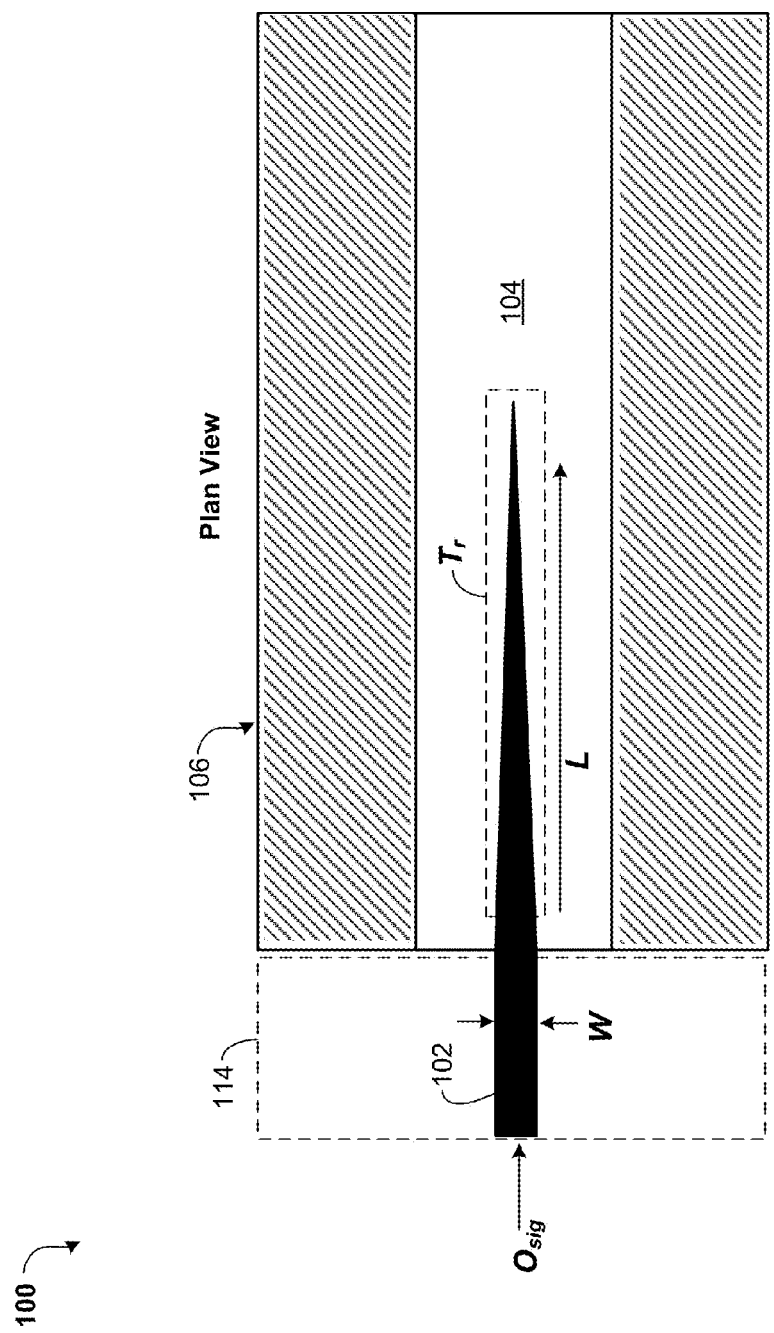
FIGS. 1A-1C respectively illustrate a plan (top) view, a side view, and an end view of a photonic waveguide structure according to one embodiment.
Figure 1B:
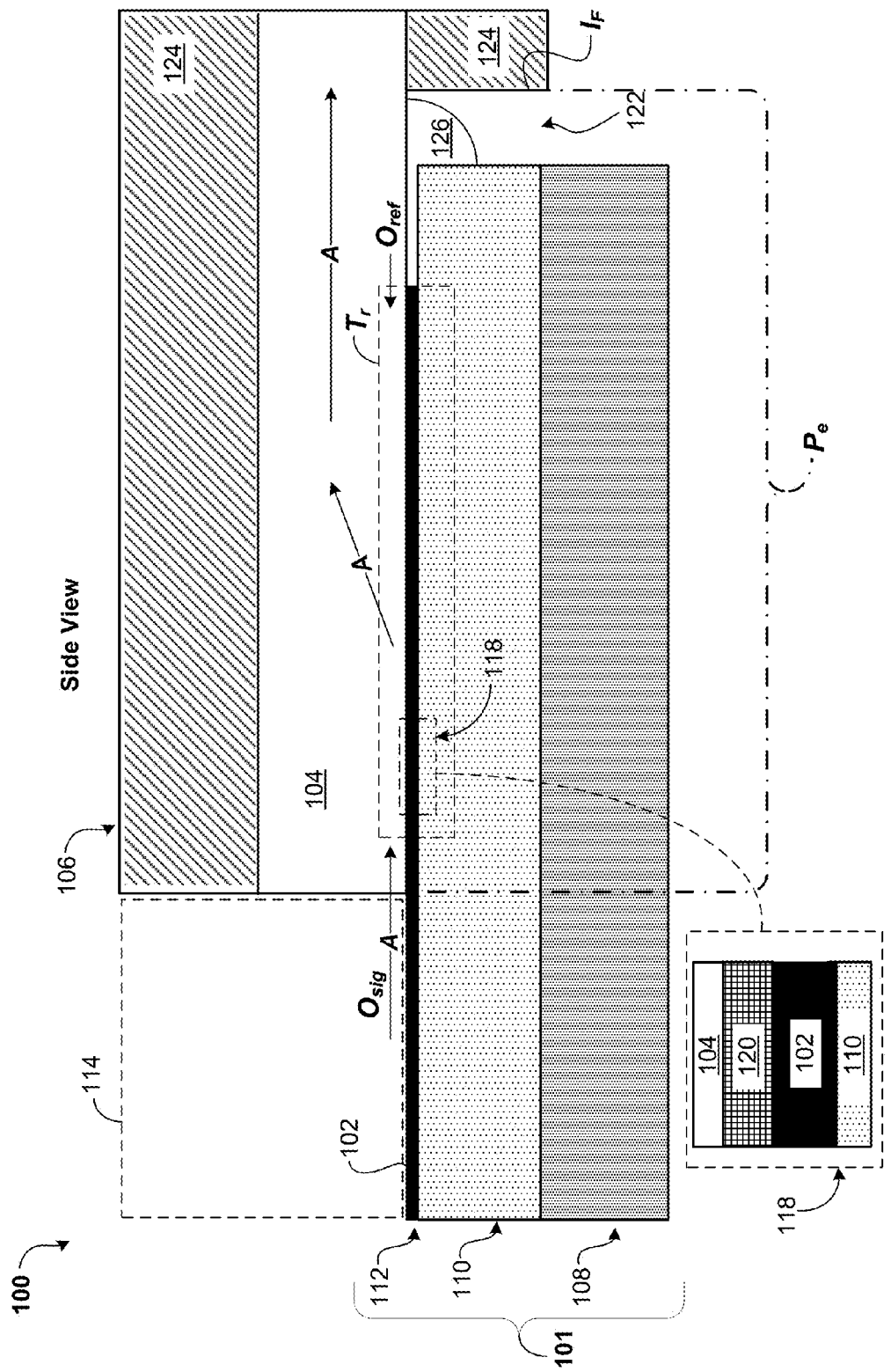
Figure 1C:
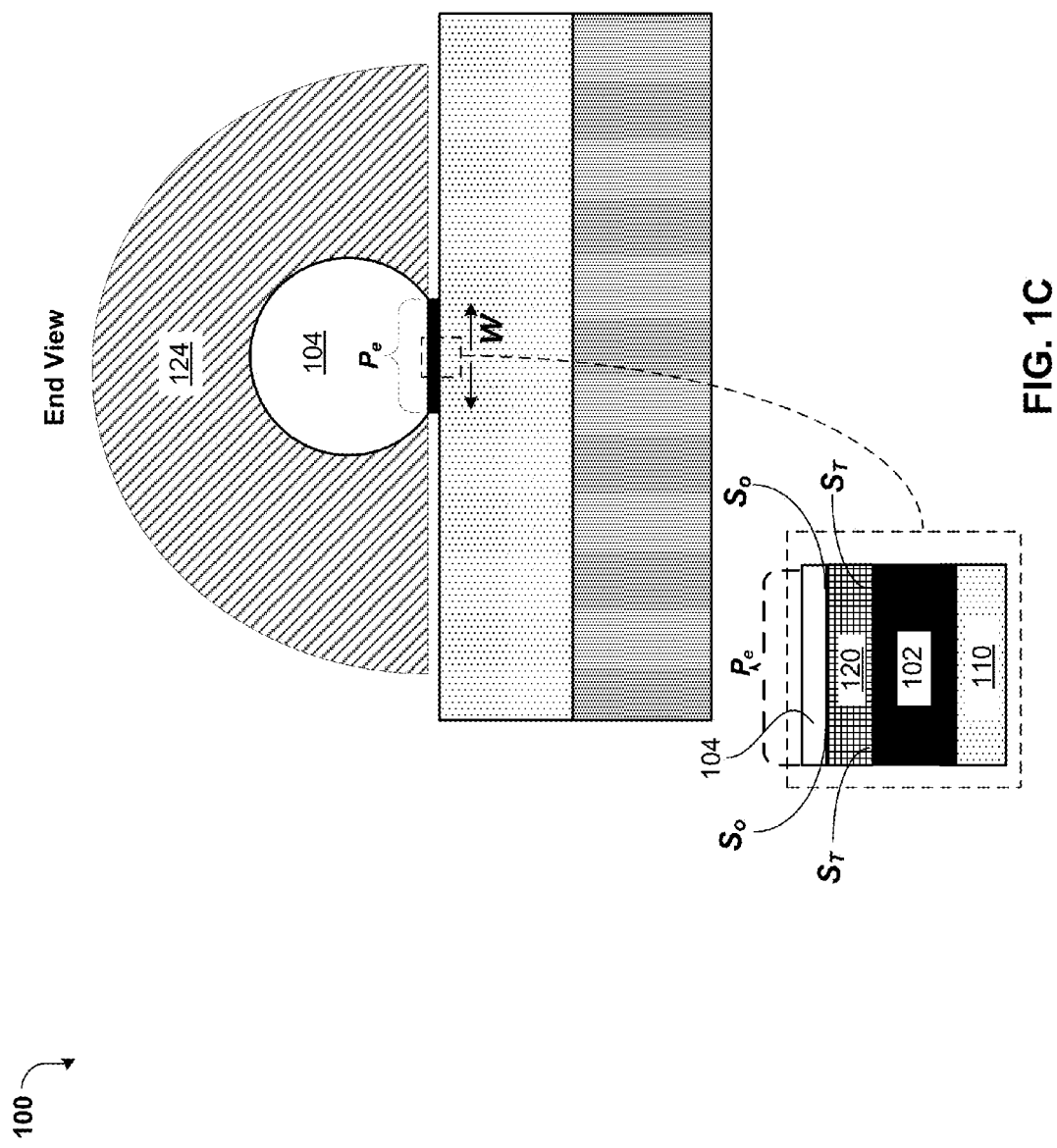

Referring to FIGS. 1A-1C, a plan (top) view, a side view, and an end view of a photonic waveguide structure 100 according to one embodiment is depicted. As depicted in FIG. 1A, the photonic waveguide structure 100 may include a tapered photonic waveguide structure 102 that is coupled to a core region 104 of an optical fiber waveguide (e.g., SMF-28) 106. The tapered photonic waveguide structure 102 may include a tapered region $T_r$ that progressively tapers in width W along a longitudinal length L of the tapered photonic waveguide structure 102. As illustrated, the tapered region $T_r$ of the tapered photonic waveguide structure 102 is coupled directly or indirectly (i.e., by close proximity) to the core region 104 of optical fiber waveguide (e.g., SMF-28) 106. This is more clearly depicted with the aid of FIG. 1B. The tapered region $T_r$ of photonic waveguide structure 102 may include a length of about 20 μm-1000 μm.

As shown in FIG. 1B, the tapered photonic waveguide structure 102 may be formed on an integrated circuit 101 having, for example, a silicon substrate layer 108, a buried oxide (BOX) layer 110, and a silicon-on-insulator (SOI) layer 112. The tapered photonic waveguide structure 102 may accordingly be formed from the single crystalline silicon material of the SOI layer 112 (i.e., a photonic substrate) using conventional lithographic and etching processes. The area or region 114 surrounding the silicon tapered photonic waveguide structure 102 may be an oxide material associated with an interlayer dielectric (ILD) used within the back-end-of-the-line (BEOL) region of the integrated circuit. More particularly, as depicted in the expanded view of region 118, an oxide material 120 associated with region 114 may be formed between the silicon tapered photonic waveguide structure 102 and the core region 104 of optical fiber waveguide 106.

Thus, the silicon tapered photonic waveguide structure 102 and the core region 104 of optical fiber waveguide 106 are within close proximity of each other. For example, the oxide material 120 located between the silicon tapered photonic waveguide structure 102 and the core region 104 of optical fiber waveguide 106 may include a thickness of about 50-200 nanometers (nm), although other greater or lesser thicknesses may also be contemplated. The oxide material 120 may, for example, include a polysiloxane index matching adhesive. In operation, as depicted by arrows A, a single mode optical signal $O_{sig}$ propagates along the silicon tapered photonic waveguide structure 102 and is optically coupled from the tapered photonic waveguide structure 102 to the core region 104 of optical fiber waveguide 106 via the intermediate oxide material 120. It may, however, be appreciated that in an alternative embodiment, the silicon tapered photonic waveguide structure 102 and the core region 104 of optical fiber waveguide 106 may be in direct contact and, therefore, not coupled via the intermediary of the oxide material 120. Thus, in operation, the single mode optical signal $O_{sig}$ propagates along the silicon tapered photonic waveguide structure 102 and is directly optically coupled from the tapered photonic waveguide structure 102 to the core region 104 of optical fiber waveguide 106. As the single mode optical signal $O_{sig}$ propagates along the silicon tapered photonic waveguide structure 102, as the tapering of the width increases, a higher portion (i.e., power) of the single mode $TE_{00}$ optical signal $O_{sig}$ decouples from the silicon tapered photonic waveguide structure 102 and subsequently couples into the core region 104 of optical fiber waveguide 106.

Further referring to FIG. 1B, as depicted, a portion 122 of the cladding region 124 of optical fiber waveguide 106 is polished away or removed (e.g., via etching) in order to expose a portion $P_e$ of the core region 104. Referring to the end view depicted in FIG. 1C, this in turn enables the outer surface $S_o$ of the exposed portion $P_e$ of the core region 104 to be coupled to the top surface $S_T$ of tapered photonic waveguide structure 102 via oxide material 120. As previously stated, in an alternative embodiment, the outer surface $S_o$ of the exposed portion $P_e$ of the core region 104 may be directly coupled to the top surface $S_T$ of tapered photonic waveguide structure 102. More specifically, as further depicted in FIG. 1C, during the polishing and subsequent removal of portion 122 (FIG. 1B) of the cladding region 124, the outer surface $S_o$ of the exposed portion $P_e$ of the core region 104 may also be polished to form a substantially flat outer surface profile for coupling to the substantially flat layer of oxide material 120. Alternatively, during the polishing and subsequent removal of portion 122 (FIG. 1B) of the cladding region 124, the outer surface $S_o$ of the exposed portion $P_e$ of the core region 104 may be polished to form a substantially flat outer surface profile for direct coupling to the substantially flat top surface $S_T$ of tapered photonic waveguide structure 102.

The outer surface $S_o$ of the exposed portion $P_e$ of the core region 104 may be polished to form a substantially flat outer surface profile having a width that is substantially the same as that of the width W of the tapered photonic waveguide structure 102. However, it may be appreciated that the width of the substantially flat outer surface profile of the exposed portion $P_e$ of the core region 104 can vary relative to the width W of the tapered photonic waveguide structure 102, such that a greater or lesser width relative to width W may be contemplated.

Referring back to FIG. 1B, a refractive index matching material 126 may be applied in the region surrounding the end of the tapered photonic waveguide structure 102 in order to mitigate the occurrence of a reflected signal $O_{ref}$ associated with the propagation of single mode optical signal $O_{sig}$ along the silicon tapered photonic waveguide structure 102. As shown, the removed portion 122 of the cladding region 124 may lead to the formation of a substantially step shaped interface $I_F$. Accordingly, the polishing or etching process facilitates the formation of this substantially step shaped interface $I_F$ in order to allow the core region 104 to lie flat over the tapered photonic waveguide structure 102.

Figure 2A:
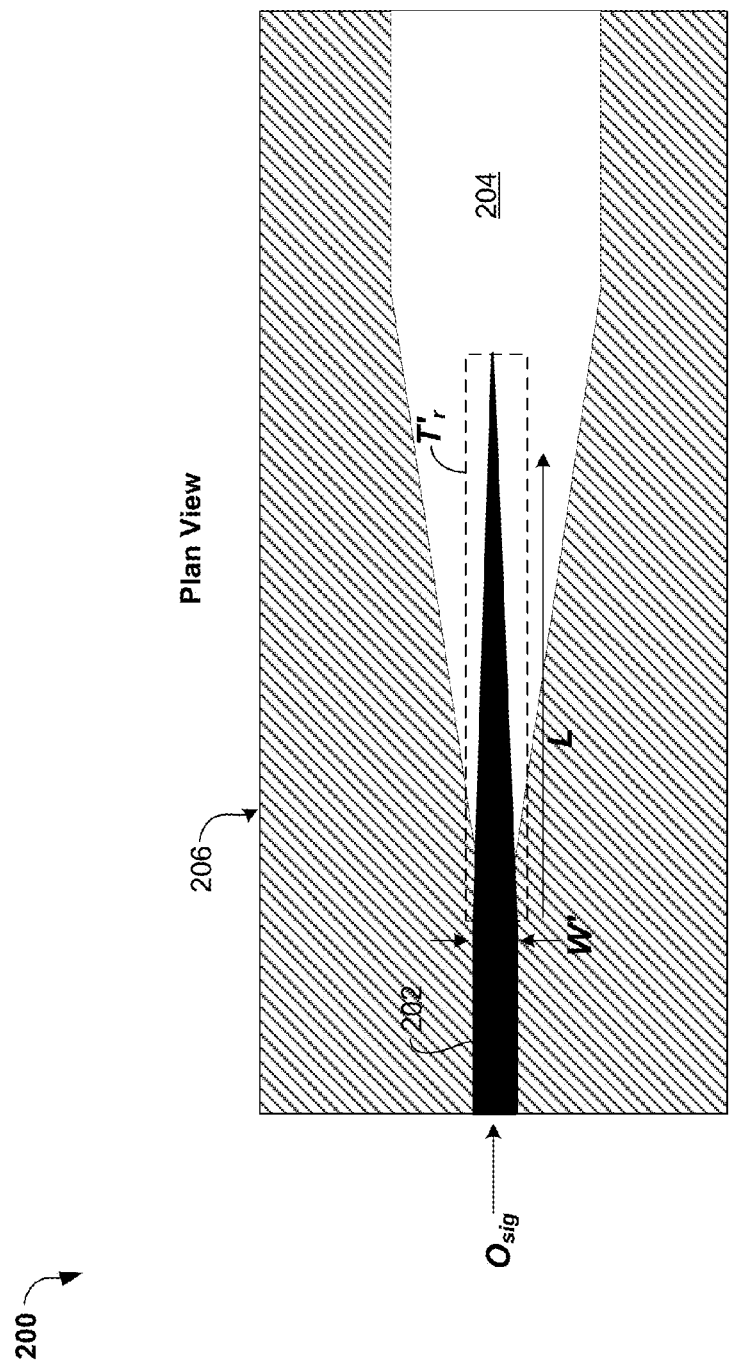
FIGS. 2A-2C respectively illustrate a plan (top) view, a side view, and an end view of a photonic waveguide structure according to another embodiment.
Figure 2B:
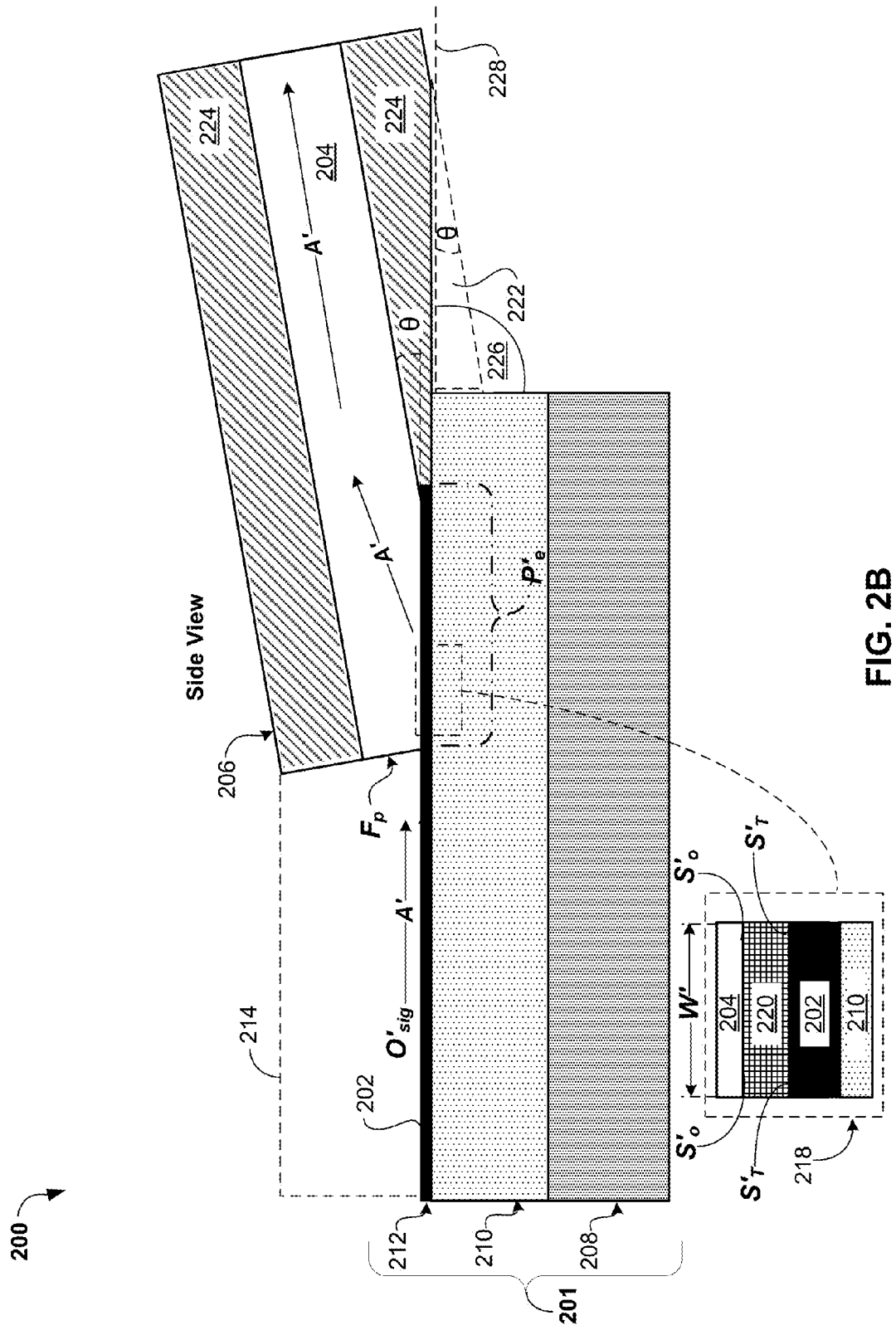
Figure 2C:
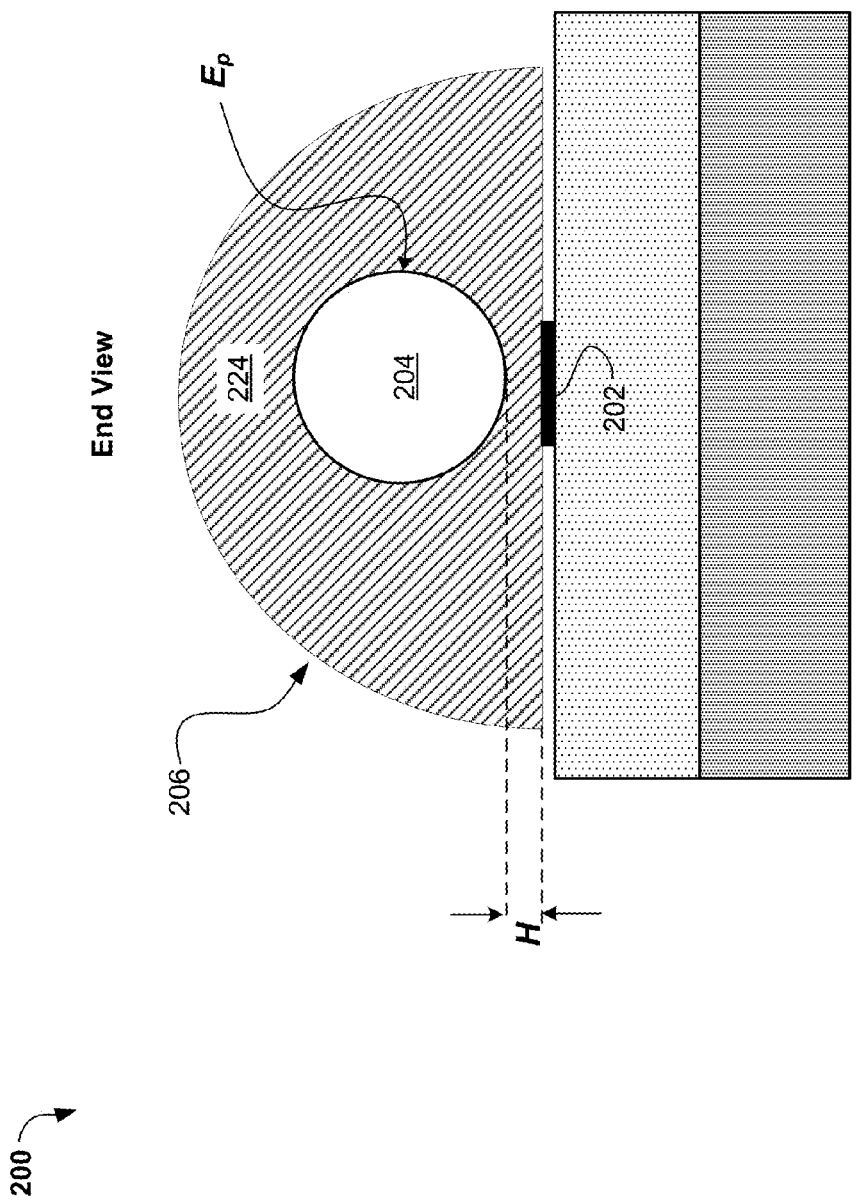

As depicted below in relation to FIG. 2A-2C, in an alternative exemplary embodiment, the polishing and exposure of a portion of the core region may be carried out in a manner that mitigates the need for forming the abrupt substantially step shaped interface $I_F$ illustrated in FIG. 1B. Accordingly, FIGS. 2A-2C, refer to a plan (top) view, a side view, and an end view of a photonic waveguide structure 200 according to an alternative embodiment. As depicted in the plan view of FIG. 2A, the photonic waveguide structure 200 may include a tapered photonic waveguide structure 202 that is coupled to a core region 204 of an optical fiber waveguide (e.g., SMF-28) 206. The tapered photonic waveguide structure 202 may include a tapered region $T'_r$ that progressively tapers in width W' along a longitudinal length L of the tapered photonic waveguide structure 202. As illustrated, the tapered region $T'_r$ of the tapered photonic waveguide structure 202 is coupled directly or indirectly (i.e., by close proximity) to the core region 204 of optical fiber waveguide (e.g., SMF-28) 206. This is more clearly depicted with the aid of FIG. 2B. The tapered region $T'_r$ of photonic waveguide structure 202 may include a length of about 20 μm-1000 μm. In the embodiment of FIGS. 2A-2C, the core region 204 of the optical fiber waveguide (e.g., SMF-28) 206 is exposed by polishing the core 204 and the cladding 224 of the optical fiber 206 at an angle ranging from about 1-30 degrees. This is illustrated and described with the aid of the side view of the photonic waveguide structure 200 shown in FIG. 2B.

As depicted in FIG. 2B, portion $P'_e$ of the core region 204 of optical fiber waveguide (e.g., SMF-28) 206 is exposed by polishing regions of both the core 204 and the cladding 224 of the optical fiber 206 at angle θ relative to horizontal axis 228. As previously indicated, this angled polishing for exposing the portion $P'_e$ of the core 204 that couples to the photonic waveguide structure 202 may, among other things, mitigate the need for forming the abrupt substantially step shaped interface $I_F$ illustrated in FIG. 1B.

As shown in FIG. 2B, the tapered photonic waveguide structure 202 may be formed on an integrated circuit 201 having, for example, a silicon substrate layer 208, a buried oxide (BOX) layer 210, and a silicon-on-insulator (SOI) layer 212. The tapered photonic waveguide structure 202 may accordingly be formed from the single crystalline silicon material of the SOI layer 212 (i.e., a photonic substrate) using conventional lithographic and etching processes. The area or region 214 surrounding the silicon tapered photonic waveguide structure 202 may be an oxide material associated with an interlayer dielectric (ILD) used within the back-end-of-the-line (BEOL) region of the integrated circuit. More particularly, as depicted in the expanded view of region 218, an oxide material 220 associated with region 214 may be formed between the silicon tapered photonic waveguide structure 202 and the core region 204 of optical fiber waveguide 206.

Thus, the silicon tapered photonic waveguide structure 202 and the core region 204 of optical fiber waveguide 206 are within close proximity of each other. For example, the oxide material 220 located between the silicon tapered photonic waveguide structure 202 and the core region 204 of optical fiber waveguide 206 may include a thickness of about 50-200 nanometers (nm), although other greater or lesser thicknesses may also be contemplated. The oxide material 220 may, for example, include a polysiloxane index matching adhesive. In operation, as depicted by arrows A', a single mode optical signal $O'_{sig}$ propagates along the silicon tapered photonic waveguide structure 202 and is optically coupled from the tapered photonic waveguide structure 202 to the core region 204 of optical fiber waveguide 206 via the intermediate oxide material 220. It may, however, be appreciated that in an alternative embodiment, the silicon tapered photonic waveguide structure 202 and the core region 204 of optical fiber waveguide 206 may be in direct contact and, therefore, not coupled via the intermediary of the oxide material 220. Thus, in operation, the single mode optical signal $O'_{sig}$ propagates along the silicon tapered photonic waveguide structure 202 and is directly optically coupled from the tapered photonic waveguide structure 202 to the core region 204 of optical fiber waveguide 206. As the single mode optical signal $O'_{sig}$ propagates along the silicon tapered photonic waveguide structure 202, as the tapering of the width increases, a higher portion (i.e., power) of the single mode $TE_{00}$ optical signal $O'_{sig}$ decouples from the silicon tapered photonic waveguide structure 202 and subsequently couples into the core region 204 of optical fiber waveguide 206.

Further referring to FIG. 2B, as depicted, a portion 222 of the cladding region 224 of optical fiber waveguide 206 is polished away in order to expose the portion $P'_e$ of the core region 204. More particularly, the cladding region 224 of optical fiber waveguide 206 is polished at angle θ in order to expose portion $P'_e$ of the core region 204. Thus, as illustrated, the optical fiber waveguide 206 has an elevation angle of θ relative to the silicon tapered photonic waveguide structure 202.

Referring to the end view depicted in FIG. 2C, as a result of the angular relationship between the core region 204 of optical fiber waveguide 206 and the tapered photonic waveguide structure 202, the end portion $E_p$ of the core region 204 is elevated, as indicated by H, relative to the tapered photonic waveguide structure 202.

However, referring back to FIG. 2B, at the front portion $F_p$ of the core region 204, the core region 204 of optical fiber waveguide 206 and the tapered photonic waveguide structure 202 are proximity coupled or directly coupled over exposed portion $P'_e$ of the core region 204. The outer surface $S'_o$ of the exposed portion $P'_e$ of the core region 204 may also be polished to form a substantially flat outer surface profile for coupling to the substantially flat layer of oxide material 220. Alternatively, during the polishing and subsequent removal of portion 222 of the cladding region 224, the outer surface of the exposed portion $P'_e$ of the core region 204 may be polished to form a substantially flat outer surface profile for direct coupling to the substantially flat top surface $S'_T$ of tapered photonic waveguide structure 202.

The outer surface $S'_o$ of the exposed portion $P'_e$ of the core region 204 may be polished to form a substantially flat outer surface profile having a width that is substantially the same as that of the width W' (also see FIG. 2A) of the tapered photonic waveguide structure 202. However, it may be appreciated that the width of the substantially flat outer surface profile of the exposed portion $P'_e$ of the core region 204 can vary relative to the width W' of the tapered photonic waveguide structure 202, such that a greater or lesser width relative to width W' may be contemplated. A refractive index matching material 226 may be applied to mitigate the occurrence of a reflected signal associated with the propagation of single mode optical signal $O'_{sig}$ along the silicon tapered photonic waveguide structure 202.

Figure 3:
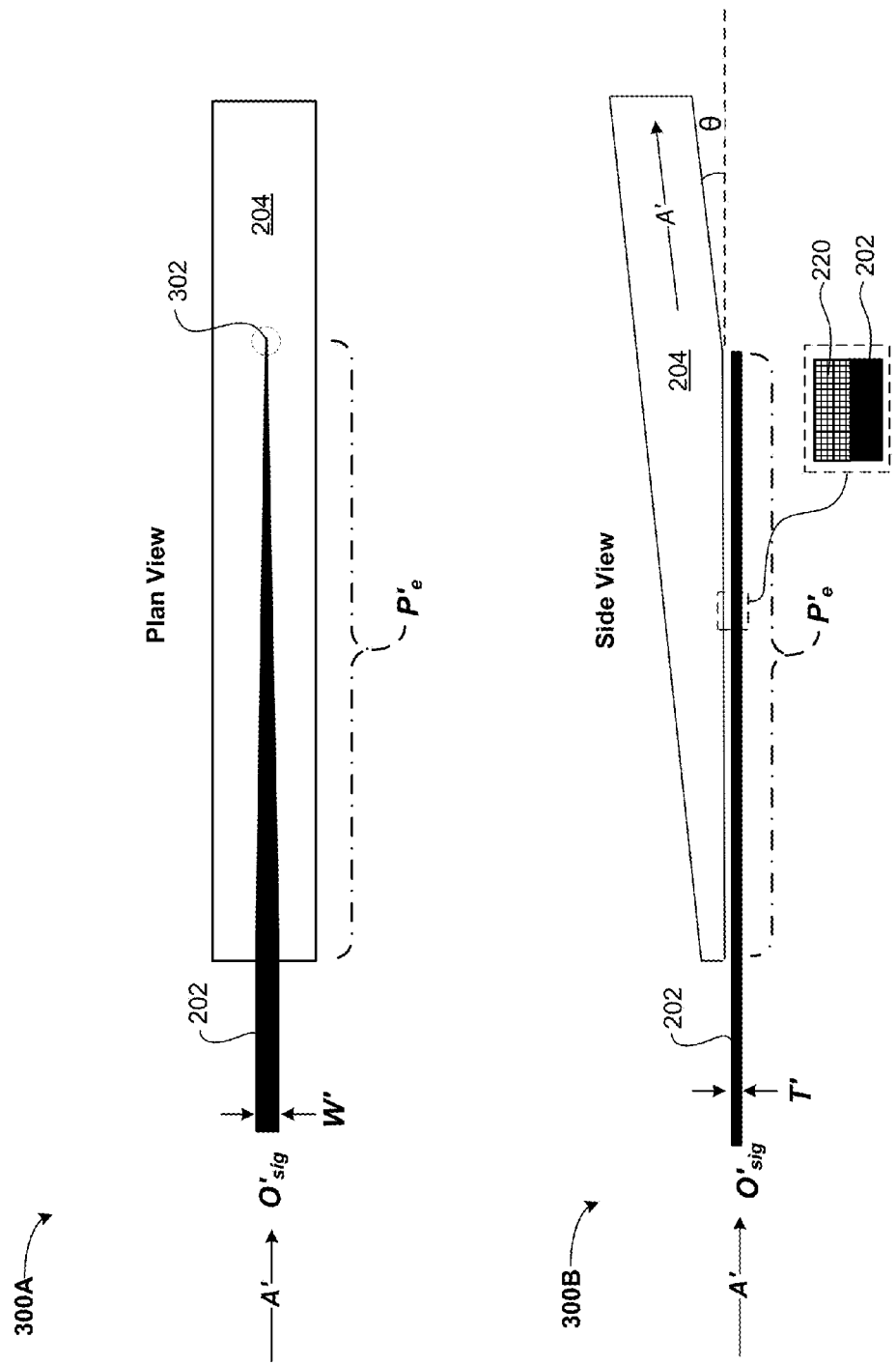
FIG. 3 illustrates another plan view and side view corresponding to the embodiment of FIGS. 2A-2C.

Referring to FIG. 3, another plan view and side view of the embodiment of FIGS. 2A-2C is depicted. As shown in the plan view 300A, the silicon tapered photonic waveguide structure 202 may include a width W' of about 1 μm. Referring to side view 300B, the thickness T' of the silicon tapered photonic waveguide structure 202 may be about 0.3 μm. As further illustrated, the width W' of the silicon tapered photonic waveguide structure 202 tapers down along its length to a tip 302 having a width of about 200 nm. The silicon tapered photonic waveguide structure 202 may be formed from, for example, a silicon nitride (SiN) material. The core region 204 may include a 6.4 μm core diameter, which corresponds to a single mode fiber waveguide that includes a corresponding 80 μm cladding diameter.

Using a Finite Difference Time Domain (FDTD) simulation tool, a 92% coupling efficiency between the silicon tapered photonic waveguide structure 202 and the core region 204 may be observed. For example, for an incident 1.00 micro-watt (μW) single mode optical signal (e.g., $TE_{00}$ single mode) guided within the silicon tapered photonic waveguide structure 202, 0.92 μW is coupled to the core region 204 as the 1.0 μW single mode optical signal $O'_{sig}$ (e.g., $TE_{00}$ single mode) propagates along the silicon tapered photonic waveguide structure 202 in proximity to the exposed portion $P'_e$ of the core region 204. More specifically, as the single mode optical signal $O'_{sig}$ (e.g., $TE_{00}$ single mode) gradually decouples from the silicon tapered photonic waveguide structure 202 with the tapering of width W', the decoupled single mode optical signal starts to couple to the exposed portion P'$_e$ of the core region 204 via intermediate oxide material 220 (e.g., polysiloxane index matching adhesive).

Figure 4:
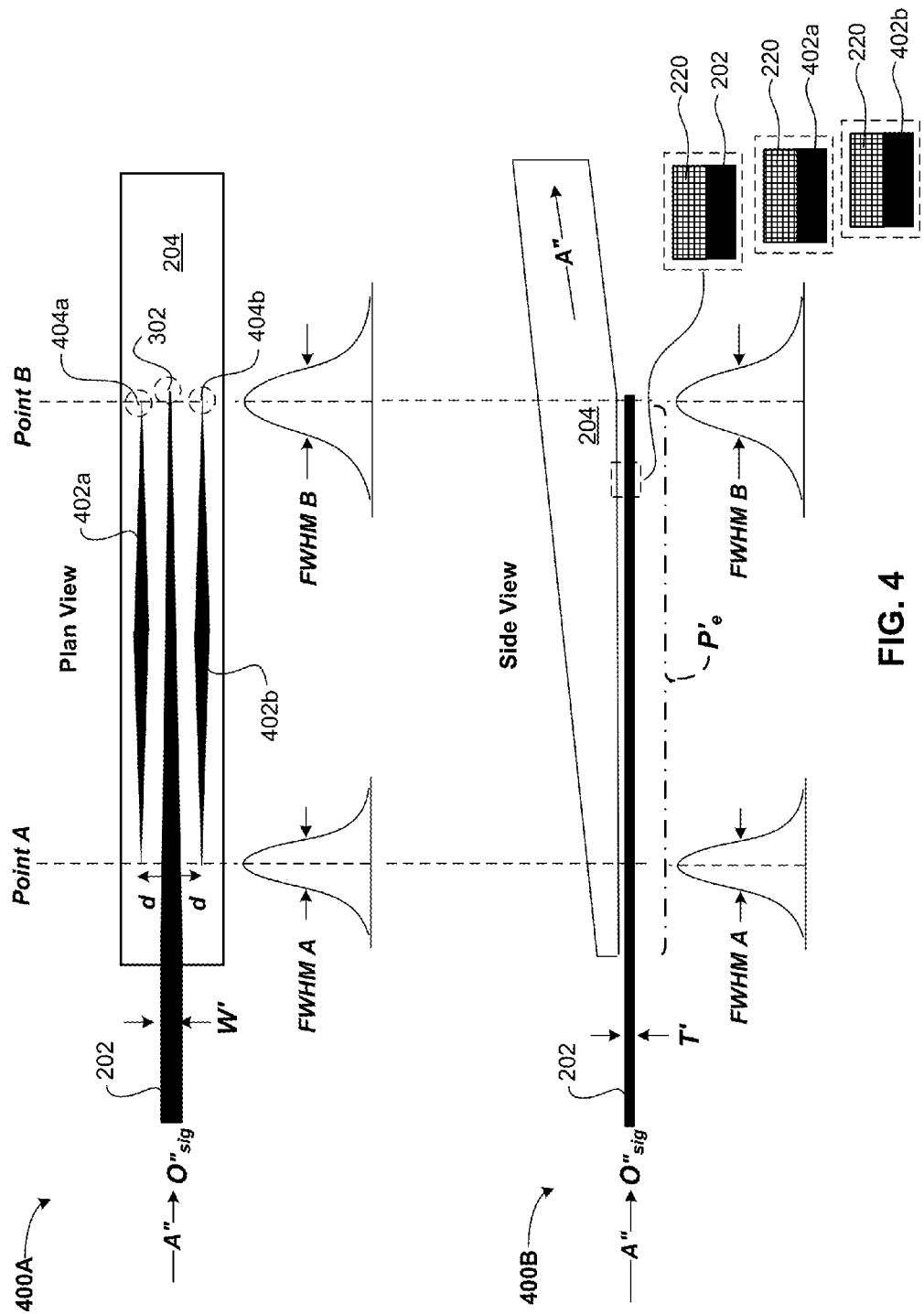
FIG. 4 illustrates a plan view and side view a photonic waveguide structure according to yet another embodiment.

Referring to FIG. 4, a plan view and a side view of a photonic waveguide structure 400 according to yet another embodiment is depicted. The photonic waveguide structure 400 is, in part, identical to the embodiment of FIGS. 2A-2C. However, photonic waveguide structure 400 includes additional satellite tapered photonic waveguide structures 402a, 402b that are located on opposing sides of silicon tapered photonic waveguide structure 202 and formed on integrated circuit 201 (FIG. 2B). The satellite tapered photonic waveguide structures 402a, 402b that are both adjacent to and substantially parallel to silicon tapered photonic waveguide structure 202 may be separated from silicon tapered photonic waveguide structure 202 by a dielectric material (e.g., oxide material) associated with the ILD used within the BEOL region of integrated circuit 201.

As shown in the plan view 400A, the silicon tapered photonic waveguide structure 202 may include a width W' of about 1 μm. Referring to side view 400B, the thickness T' of the silicon tapered photonic waveguide structure 202 may be about 0.3 μm. As further illustrated, the width W' of the silicon tapered photonic waveguide structure 202 tapers down along its length to a tip 302 having a width of about 200 nm. Similarly, adjacent satellite tapered photonic waveguide structures 402a and 402b may also include a width of about 1 μm or less. The thickness of adjacent satellite tapered photonic waveguide structures 402a and 402b may be about 0.3 μm. As further illustrated, the width of the adjacent satellite tapered photonic waveguide structures 402a, 402b taper down along their respective lengths to tips 404a, 404b also having a width of about 200 nm. The adjacent satellite tapered photonic waveguide structures 402a, 402b may also be formed from, for example, a silicon nitride (SiN) material. The core region 204 may include a 6.4 μm core diameter, which corresponds to a single mode fiber waveguide that includes a corresponding 80 μm cladding diameter.

Using the FDTD simulation tool, over 92% coupling efficiency between the silicon tapered photonic waveguide structure 202 and the core region 204 may be observed based on the optical mode broadening generated by the adjacent satellite tapered photonic waveguide structures 402a, 402b. As depicted, at Point A, single mode optical signal O"$_{sig}$ has a Full-Width-Half-Maximum (FWHM) of A. As the single mode optical signal O"$_{sig}$ propagates adjacent to the satellite tapered photonic waveguide structures 402a, 402b, at Point B, single mode optical signal O"$_{sig}$ undergoes a lateral mode broadening to an increased Full-Width-Half-Maximum (FWHM) of B. The satellite tapered photonic waveguide structures 402a, 402b stretch out the substantially Gaussian-shaped single mode optical signal O"$_{sig}$ as it is guided along the silicon tapered photonic waveguide structure 202 in proximity to the exposed portion P'$_e$ of the core region 204.

For example, for an incident 1.00 micro-watt (μW) single mode optical signal O"$_{sig}$ (e.g., TE$_{00}$ single mode) guided within the silicon tapered photonic waveguide structure 202, greater than 0.92 μW may be coupled to the core region 204 as the 1.0 μW single mode optical signal O"$_{sig}$ (e.g., TE$_{00}$ single mode) propagates along the silicon tapered photonic waveguide structure 202 in proximity to the exposed portion P'$_e$ of the core region 204. More specifically, as the single mode optical signal O"$_{sig}$ (e.g., TE$_{00}$ single mode) gradually decouples from the silicon tapered photonic waveguide structure 202 with the tapering of width W', the decoupled single mode optical signal starts to couple to the exposed portion P'$_e$ of the core region 204 having the higher index value via intermediate oxide material 220 (e.g., polysiloxane index matching adhesive). The increased coupling efficiency (i.e., >0.92) associated with the embodiment of FIG. 4 may be attributed to the lateral mode broadening mechanism provided by the satellite tapered photonic waveguide structures 402a, 402b. It may be appreciated that the separation (d) and/or length of these adjacent satellite tapered photonic waveguide structures 402a, 402b relative to tapered photonic waveguide structure 202 depends on the magnitude of mode broadening desired. These parameters (i.e., length, separation, etc.) can be optimized via simulation tools such as the FDTD. The mode broadening in turn tunes the numerical aperture (NA) of the optical signal guided by tapered photonic waveguide structure 202 to more closely match that of the core region 204 of the optical fiber waveguide receiving the optical signal.

Figure 5:
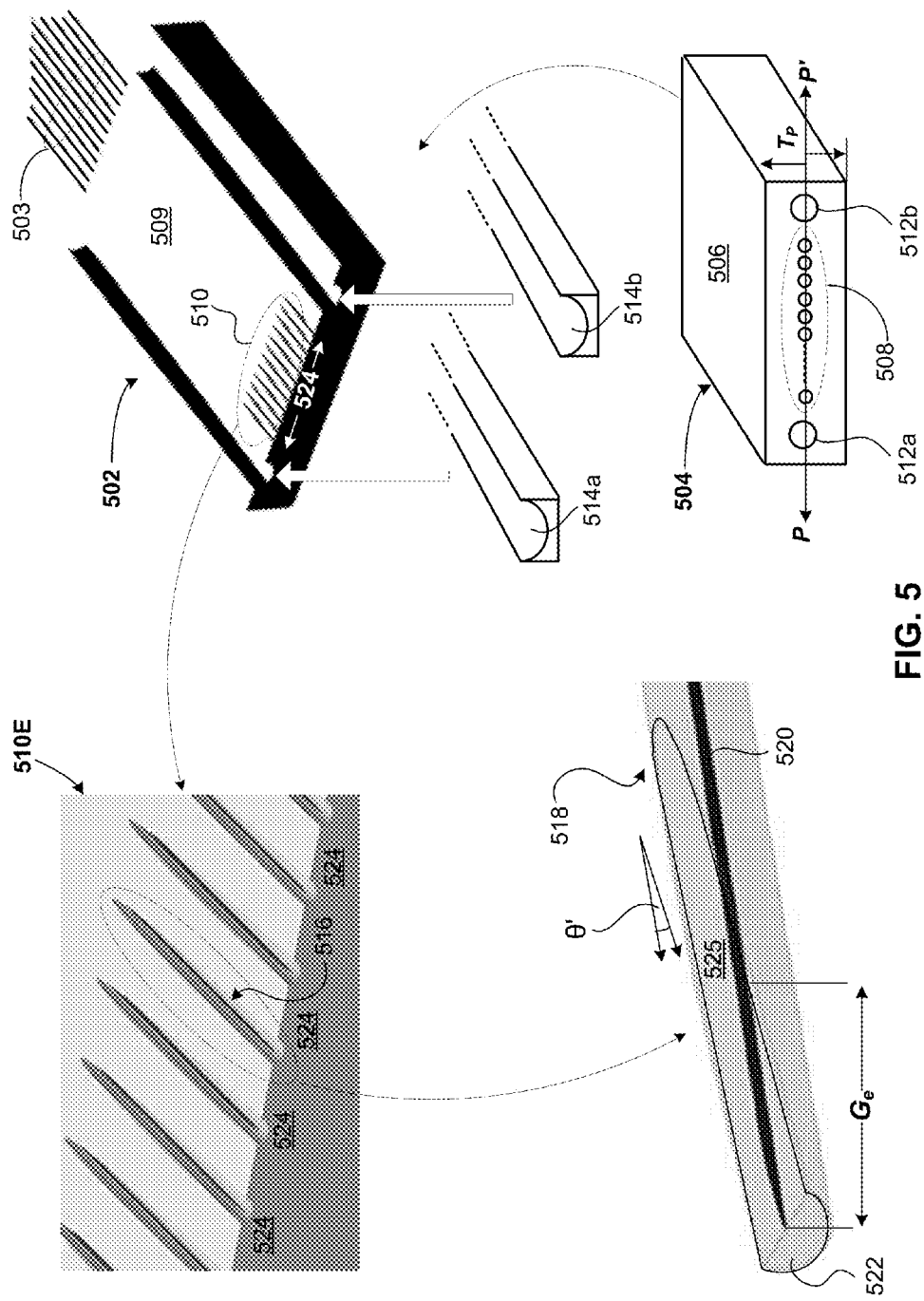
FIG. 5 illustrates the forming of a photonic waveguide coupling device using a multi-fiber fiber optic ferrule device according to one embodiment.

FIG. 5 illustrates the forming of a photonic waveguide coupling device 502 using a multi-fiber fiber optic ferrule device 504 according to one embodiment. As depicted, the multi-fiber fiber optic ferrule device 504 may include a substantially rectangular housing 506 having a single row of substantially parallel holes (e.g., 24 holes) 508 that are operable to receive, for example, a plurality of single mode fibers (e.g., 24 fibers). The multi-fiber fiber optic ferrule device 504 may also include a pair of alignment holes 512a, 512b for aligning the multi-fiber fiber optic ferrule device 504 with another device such as an integrated circuit having photonic devices.

The photonic waveguide coupling device 502 may be formed by removing a top portion T$_P$ of the multi-fiber fiber optic ferrule device 504. This may be accomplished by cutting the multi-fiber fiber optic ferrule device 504 along axis P-P' to form a fiber mounting block 509. By removing the top portion T$_P$, the fiber mounting block 509 of the photonic waveguide coupling device 502 now includes a single row of substantially parallel channels (e.g., 24 channels) 510 and a pair of alignment channels 514a, 514b (expanded view). As shown, an expanded view 510E of the single row of substantially parallel channels (e.g., 24 channels) 510 is also provided. Each of the single row of substantially parallel channels (e.g., 24 channels) 510 receives an optical fiber.

Referring to expanded view 510E, for example, channel 516 receives optical fiber 518 (expanded view). As depicted, similar to the previously described processes (i.e., processes associated with FIGS. 2A-2C), optical fiber 518 is polished in order to expose a portion G$_e$ of the core 520 of optical fiber 518. However, by initially mounting the optical fiber 518 within channel 516, the optical fiber 518 may be polished while coupled to the photonic waveguide coupling device 502. Thus, the photonic waveguide coupling device 502 itself facilitates, among other things, a means for polishing the optical fiber 518. Further, since the other parallel channels (e.g., 24 channels) 510 also receive optical fibers, the polishing process for exposing a portion (e.g., portion G$_e$) of the optical fiber cores may be accomplished simultaneously. As depicted, optical fiber 518 is placed in channel 516 such that the end facet 522 of the optical fiber 518 is substantially flush with the end portion 524 of the single row of substantially parallel channels (e.g., 24 channels) 510. Similarly, other optical fibers are placed in the remaining channels corresponding to the single row of substantially parallel channels (e.g., 24 channels) 510 in a similar manner. Optical fiber 518 is then polished at a downward sloping angle (θ') along to the length of the core 520 towards the end facet 522 of the fiber 518. Similarly, other optical fibers that are placed in the remaining channels corresponding to the single row of substantially parallel channels (e.g., 24 channels) 510 may be polished in a similar manner. For illustrative brevity and clarity purposes, optical fiber 518 and corresponding channel 516 are described and depicted in expanded view. Thus, photonic waveguide coupling device 502 may be utilized following the polishing of the optical fibers that are placed in the single row of substantially parallel channels (e.g., 24 channels) 510 associated with the fiber mounting block 509.

Figure 6:
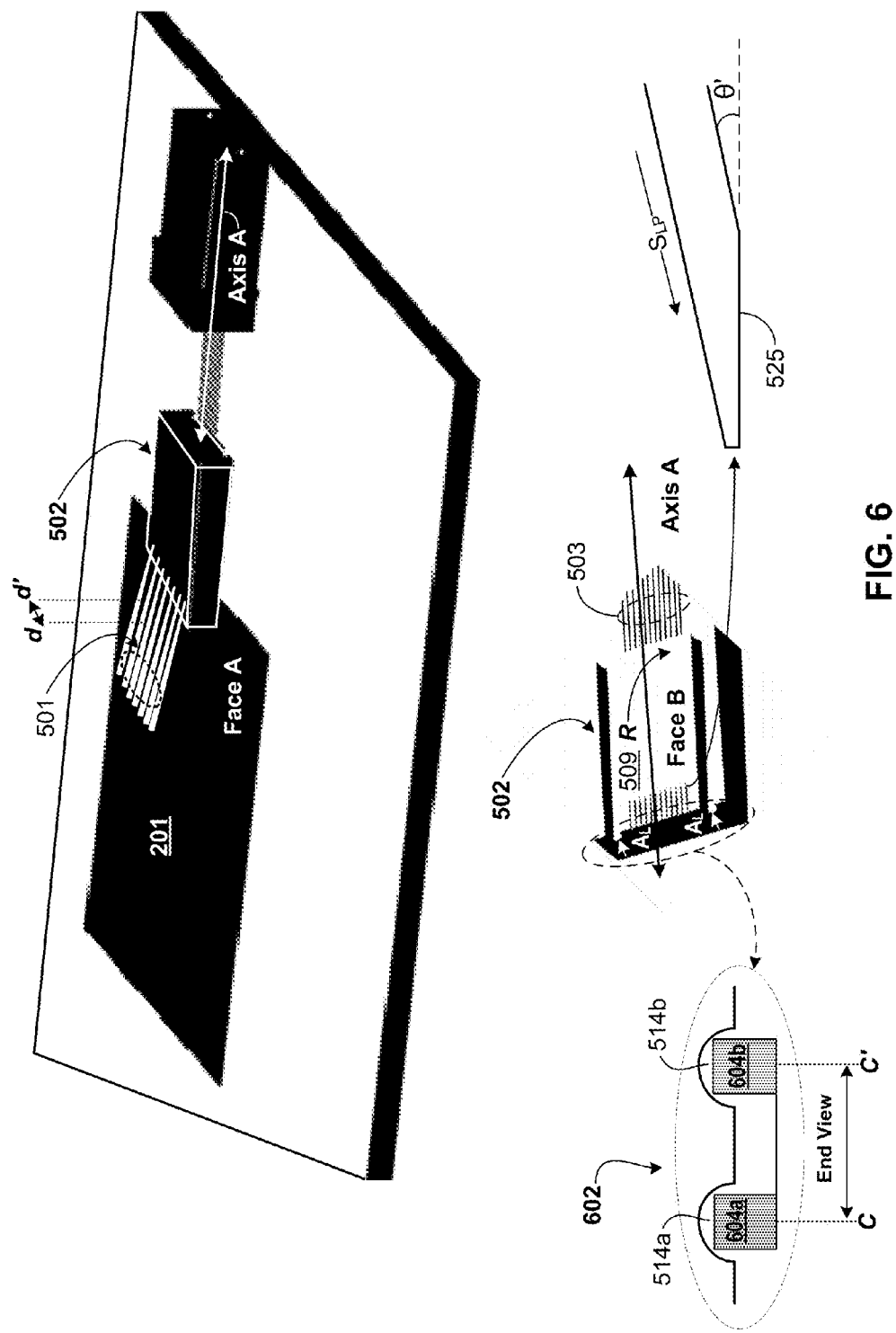
FIG. 6 illustrates the mounting of the photonic waveguide coupling device of FIG. 5 according to one embodiment.

FIG. 6 illustrates the operational mounting of the photonic waveguide coupling device 502 of FIG. 5 according to one embodiment. As shown in FIG. 6, once the optical fibers that are located in the single row of substantially parallel channels (e.g., 24 channels) 510 (FIG. 5) are polished to form the structure of optical fiber 518 (FIG. 5), the fiber mounting block 509 is rotated about Axis A such that Surface B of the mounting block 509 faces Surface A of integrated circuit 201. Each polished optical fiber may include a polished face 525 (FIG. 5) having the downward sloping angle θ'. However, as depicted in FIG. 6, once the fiber mounting block 509 is rotated about Axis A, the polished face 525 for each optical fiber now faces downward for coupling to, for example, an array of silicon tapered photonic waveguide structures 501 formed on integrated circuit 201. The exposed portions $G_e$ of the core of each of the optical fibers 503 (i.e., single mode fibers) may be coupled to each respective one of the array of silicon tapered photonic waveguide structures 501 using substantially the same exemplary process described in relation to FIGS. 2A-2B. More specifically, the exposed portions $G_e$ of the core of each of the optical fibers 503 may overlap with and be coupled to each respective one of the array of silicon tapered photonic waveguide structures 501 using index matching oxide material 220 (FIG. 2B). The index matching oxide material 220 (FIG. 2B) may include a refractive index matching adhesive such as, but not limited to, polysiloxane.

As previously described, the fiber mounting block 509 of the photonic waveguide coupling device 502 includes a single row of substantially parallel channels (e.g., 24 channels) 510 and a pair of alignment channels 514a, 514b. As shown in FIG. 6, an expanded end view 602 of the rotated photonic waveguide coupling device 502 depicts the pair of alignment channels 514a, 514b being aligned with a complementary semiconductor mesa pair 604a, 604b formed on the integrated circuit 201. As such, the pair of alignment channels 514a, 514b align with the complementary semiconductor mesa pair 604a, 604b so that exposed portions $G_e$ of the core of each of the optical fibers 503 align with each respective one of the array of silicon tapered photonic waveguide structures 501.

Thus, when forming the complementary semiconductor mesa pair 604a, 604b, the distance between the center of the mesa columns C-C' are determined to have the same or substantially the same separation as the pair of alignment channels 514a, 514b. Moreover, when forming the array of silicon tapered photonic waveguide structures 501, the distance between center of each of the array of silicon tapered photonic waveguide structures 501 may be determined to have the same or substantially the same separation d-d' as each of substantially parallel channels (e.g., 24 channels) 510 (FIG. 5).

FIG. 7 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1A-1C, FIGS. 2A-2C, and FIG. 4. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1A-1C, FIGS. 2A-2C, and FIG. 4. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1A-1C, FIGS. 2A-2C, and FIG. 4 to generate a Netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including Netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1A-1C, FIGS. 2A-2C, and FIG. 4. In one embodiment, design structure 990 may comprise a compiled, executable HDL simulation model that functionally simulates the devices shown in FIGS. 1A-1C, FIGS. 2A-2C, and FIG. 4.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1A-1C, FIGS. 2A-2C, and FIG. 4. Design structure 990 may then proceed to a stage 995 where, for example, design structure 990: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more described embodiment, the practical application or technical improvement over technologies found in the marketplace, or to enable other of ordinary skill in the art to understand the one or more embodiments disclosed herein.

What is claimed is:

1. A photonic waveguide structure comprising:
    a tapered photonic waveguide structure within a photonic substrate, the tapered photonic waveguide structure having a tapered region that progressively tapers in width along a longitudinal length of the tapered photonic waveguide structure; and
    an optical fiber waveguide having a core region and a cladding region, a portion of the core region partially exposed by removing a portion of the cladding region, an outer surface of the portion of the core region that is partially exposed substantially coupled to the tapered photonic waveguide structure,
    wherein an optical signal propagating along the tapered photonic waveguide structure is coupled from the tapered region of the tapered photonic waveguide structure to the core region of the optical fiber waveguide via the core region that is partially exposed, and wherein the tapered region of the tapered photonic waveguide structure and the core region of the optical fiber waveguide that is partially exposed comprise an orientation that is substantially parallel.

2. The structure of claim 1, further comprising:
    a polysiloxane layer located between the outer surface of the fiber core region that is partially exposed and the tapered region of the tapered photonic waveguide structure.

3. The structure of claim 2, wherein the polysiloxane layer comprises a thickness of about 50-200 micrometers (μm).

4. The structure of claim 1, further comprising:
    a bulk silicon region; and
    a buried oxide (BOX) layer located directly on the bulk silicon region, wherein the tapered photonic waveguide structure is created from a silicon-on-insulator (SOI) layer located directly on the BOX layer.

5. The structure of claim 1, wherein the tapered photonic waveguide structure comprises a silicon nitride (SiN) material having an un-tapered width of about 1.0 micrometers (μm) and a thickness of about 0.3 micrometers (μm).

6. The structure of claim 5, wherein the tapered region of the tapered photonic waveguide structure comprises a length of between 20 μm to 1000 μm.

7. The structure of claim 6, wherein the core region comprises a diameter of about 6-10 μm.

8. A photonic waveguide structure comprising:
a first tapered photonic waveguide structure located within a photonic substrate for guiding an optical signal, the first tapered photonic waveguide structure having a tapered region that progressively tapers in width along a longitudinal length of the first tapered photonic waveguide structure;
a second tapered photonic waveguide located within the photonic substrate, the second tapered photonic waveguide located adjacent one side of the first tapered photonic waveguide structure and separated from the first tapered photonic waveguide structure by a dielectric material;
a third tapered photonic waveguide located within the photonic substrate, the third tapered photonic waveguide located adjacent an opposing side to the one side of the first tapered photonic waveguide structure and separated from the first tapered photonic waveguide structure by the dielectric material; and
an optical fiber waveguide having a core region and a cladding region, a portion of the core region partially exposed by removing a portion of the cladding region, an outer surface of the portion of the core region that is partially exposed substantially coupled to the first tapered photonic waveguide structure,
wherein the optical signal propagating along the first tapered photonic waveguide structure is coupled from the tapered region of the first tapered photonic waveguide structure to the core region of the optical fiber waveguide via the core region that is partially exposed, the optical signal propagating along the first tapered photonic waveguide structure undergoing, based on the second and the third tapered photonic waveguide structure, a mode broadening prior to being coupled from the tapered region of the first tapered photonic waveguide structure to the core region of the optical fiber waveguide, and wherein the tapered region of the first tapered photonic waveguide structure and the core region of the optical fiber waveguide that is partially exposed comprise an orientation that is substantially parallel.

9. The structure of claim 8, further comprising:
a bulk silicon region; and
a buried oxide (BOX) layer located directly on the bulk silicon region, wherein the first, the second, and the third tapered photonic waveguide structure is created from a silicon-on-insulator (SOI) layer located directly on the BOX layer.

10. A method of forming a photonic waveguide coupling device from a fiber optic ferrule device having a single row of substantially parallel fiber holes for receiving a plurality of optical fibers and a pair of alignment holes, the method comprising:
forming a fiber mounting block by removing a top portion of the fiber optic ferrule device, the removed top portion converting the single row of substantially parallel fiber holes into a single row of substantially parallel channels and converting the pair of alignment holes into a pair of alignment channels;
placing a plurality of optical fibers having end facets in the single row of substantially parallel channels, the end facets being substantially flush with end portions of the single row of substantially parallel channels; and
polishing the plurality of optical fibers for exposing the core regions of the plurality of optical fibers and generating a downward sloping angle along the length of the core regions towards the end facets,
wherein the exposed core regions of the plurality of optical fibers having the downward sloping angle along the length of the core regions towards the end facets provide optical coupling with a plurality of tapered photonic waveguide structures in an integrated circuit.

11. The method of claim 10, further comprising:
rotating the mounting block for orienting the exposed core regions of the plurality of optical fibers having the downward sloping angle to face the plurality of tapered photonic waveguide structures in the integrated circuit; and
placing the pair of alignment channels over an alignment mesa pair located within the integrated circuit for mechanically aligning the plurality of tapered photonic waveguide structures with the exposed core regions of the plurality of optical fibers having the downward sloping angle.

12. The method of claim 11, wherein the plurality of tapered photonic waveguide structures mechanically aligned with the exposed core regions of the plurality of optical fibers having the downward sloping angle are coupled with a refractive index matching adhesive.

13. The method of claim 12, wherein the refractive index matching adhesive comprises a polysiloxane material.

14. The method of claim 13, wherein the downward sloping angle is in a range of angles between about 1-30 degrees.

15. The method of claim 14, wherein the plurality of optical fibers comprise a plurality of single mode fibers.

16. The method of claim 10, wherein the optical coupling between the exposed core regions of the plurality of optical fibers having the downward sloping angle and the plurality of tapered photonic waveguide structures occurs via an overlapping region between the exposed core regions and the plurality of tapered photonic waveguide structures.

* * * * *